US012655687B2

(12) United States Patent
Carbonnel

(10) Patent No.: US 12,655,687 B2
(45) Date of Patent: Jun. 16, 2026

(54) HYDRAULIC IMPACT MECHANISM FOR USE IN EQUIPMENT FOR PROCESSING ROCK AND CONCRETE

(71) Applicant: T-RIG LIMITED, Kells (IE)

(72) Inventor: Alain Carbonnel, Lyons (FR)

(73) Assignee: T-RIG LIMITED (IE)

( * ) Notice: Subject to any disclaimer, the term of this patent is extended or adjusted under 35 U.S.C. 154(b) by 0 days.

(21) Appl. No.: 18/833,996

(22) PCT Filed: Feb. 22, 2023

(86) PCT No.: PCT/EP2023/054470
§ 371 (c)(1),
(2) Date: Jul. 29, 2024

(87) PCT Pub. No.: WO2023/161297
PCT Pub. Date: Aug. 31, 2023

(65) Prior Publication Data
US 2025/0101807 A1 Mar. 27, 2025

(30) Foreign Application Priority Data
Feb. 24, 2022 (EP) .................................... 22158567

(51) Int. Cl.
*B25D 9/14* (2006.01)
*B25D 9/12* (2006.01)
*E21B 1/26* (2006.01)

(52) U.S. Cl.
CPC .................. *E21B 1/26* (2020.05); *B25D 9/12* (2013.01); *B25D 9/145* (2013.01); *B25D 2209/002* (2013.01)

(58) Field of Classification Search
CPC .................................. B25D 9/12; B25D 9/145
(Continued)

(56) References Cited

U.S. PATENT DOCUMENTS

2025/0101807 A1* 3/2025 Carbonnel ............. B25D 9/145

FOREIGN PATENT DOCUMENTS

BE 674233 A 4/1966
EP 4234170 A1 * 8/2023 ............ B25D 9/145
(Continued)

*Primary Examiner* — Praachi M Pathak

(57) ABSTRACT

The invention provides a valveless hydraulic impact mechanism for connection to a tool for processing rock or concrete or both, wherein the position for the opening of the drainage channel is arranged along the cylinder bore so as to be opened and closed by a portion of the reciprocating strike piston, the position for the opening of the connection channel leading to the first drive chamber is arranged along the cylinder bore so as to be opened and closed by a portion of the reciprocating strike piston and the position for the opening of the connection channel leading to the second drive chamber is arranged in the first or second cylinder bore so as to be opened and closed by a portion of the reciprocating accumulator piston such that, with the aid of the strike piston during its motion in the first cylinder bore and the accumulator piston in the first cylinder bore or, if present, the second cylinder bore, at least the second drive chamber acquires periodically alternating pressure for the maintenance of the reciprocating piston motion, wherein the reciprocating strike and accumulator pistons hold the second drive chamber closed for the supply or drainage of driving medium present in the second drive chamber along a distance between the opening of the drainage channel in association with a first turning point of the strike piston and the opening of the connection channel in association with a second turning point of the strike piston, wherein the motion of the strike piston along the distance between the opening of the drainage channel in association with the first turning point of the strike piston and the opening of the connection channel in association with the second turning point of the strike piston takes place during compression of the volume
(Continued)

of the accumulator compartment, wherein the magnitude of the volume of the accumulator compartment is adapted to obtain a slow change in pressure in the second drive chamber along the distance between the channel openings and wherein the strike piston and accumulator piston are solely in fluid communication such that the strike piston and accumulator piston do not make direct contact during operation of the mechanism.

20 Claims, 7 Drawing Sheets

(58) Field of Classification Search
USPC .............................................................. 173/90
See application file for complete search history.

(56) References Cited

FOREIGN PATENT DOCUMENTS

| | | | | |
|---|---|---|---|---|
| EP | 4043152 B1 * | 9/2023 | .............. | F15B 15/14 |
| JP | S5286578 A | 7/1977 | | |
| JP | S578091 A | 1/1982 | | |
| WO | 9109709 A1 | 7/1991 | | |

* cited by examiner

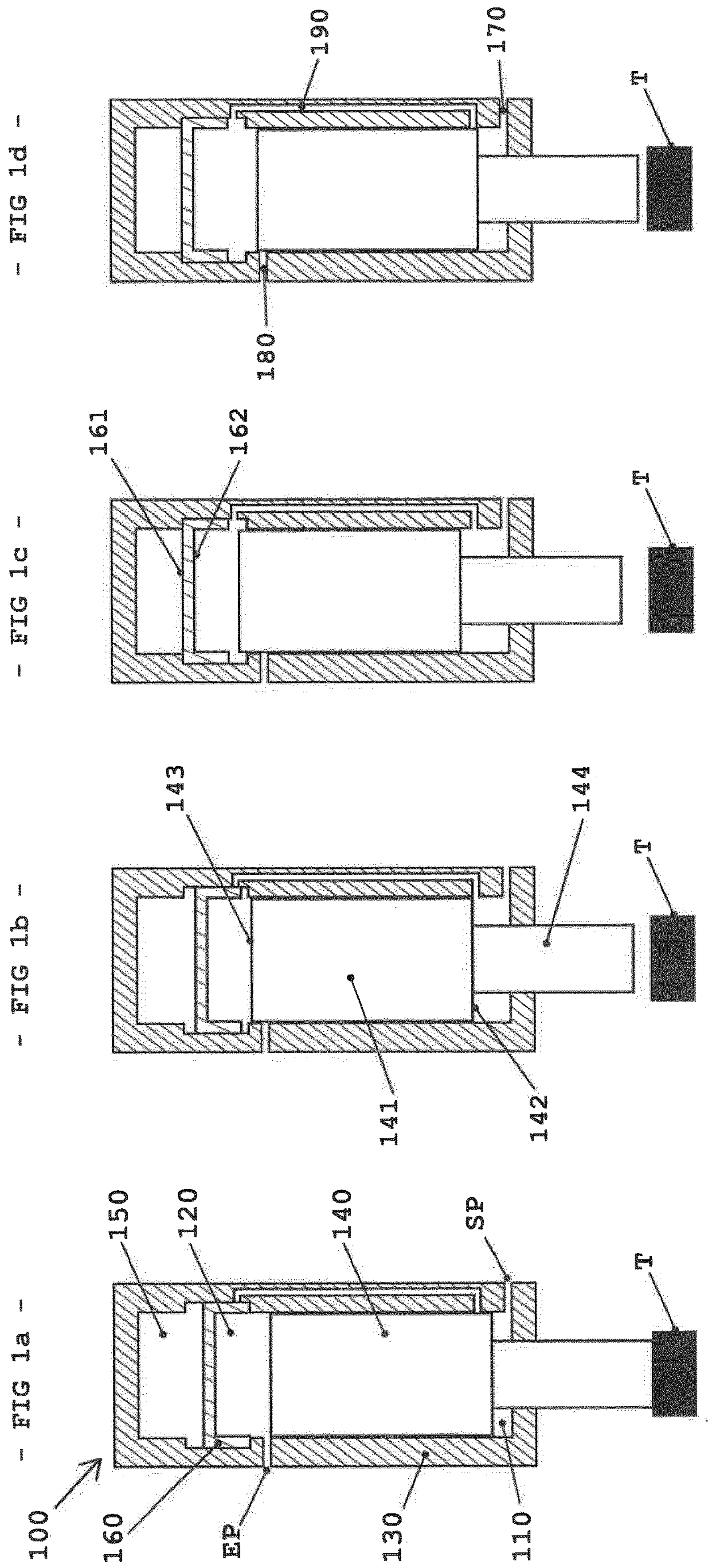
- FIG 1d -
190
170
T
180
- FIG 1c -
161
162
T
- FIG 1b -
143
144
T
141
142
- FIG 1a -
150
120
140
SP
T
100
160
EP
130
110

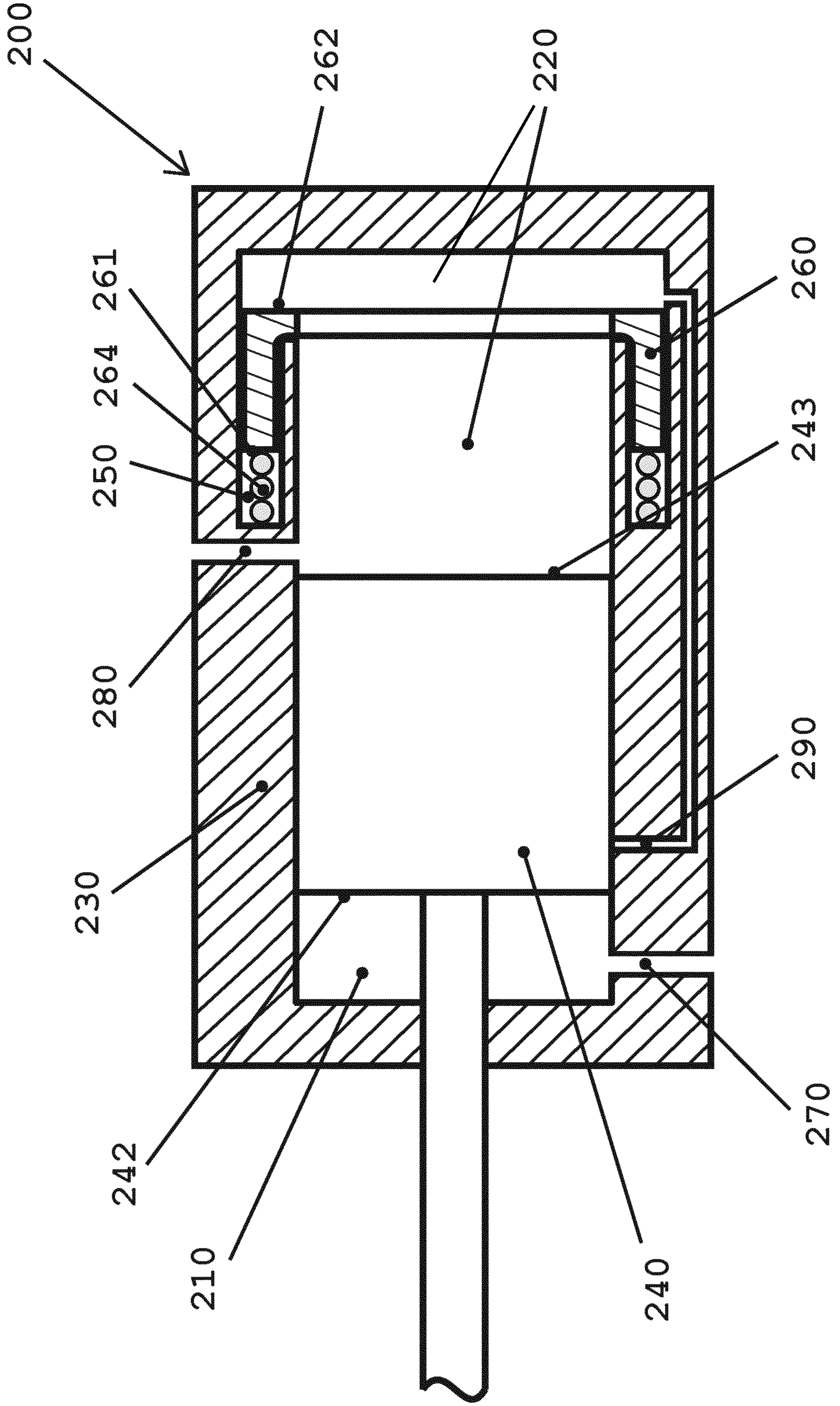
- FIG 2 -

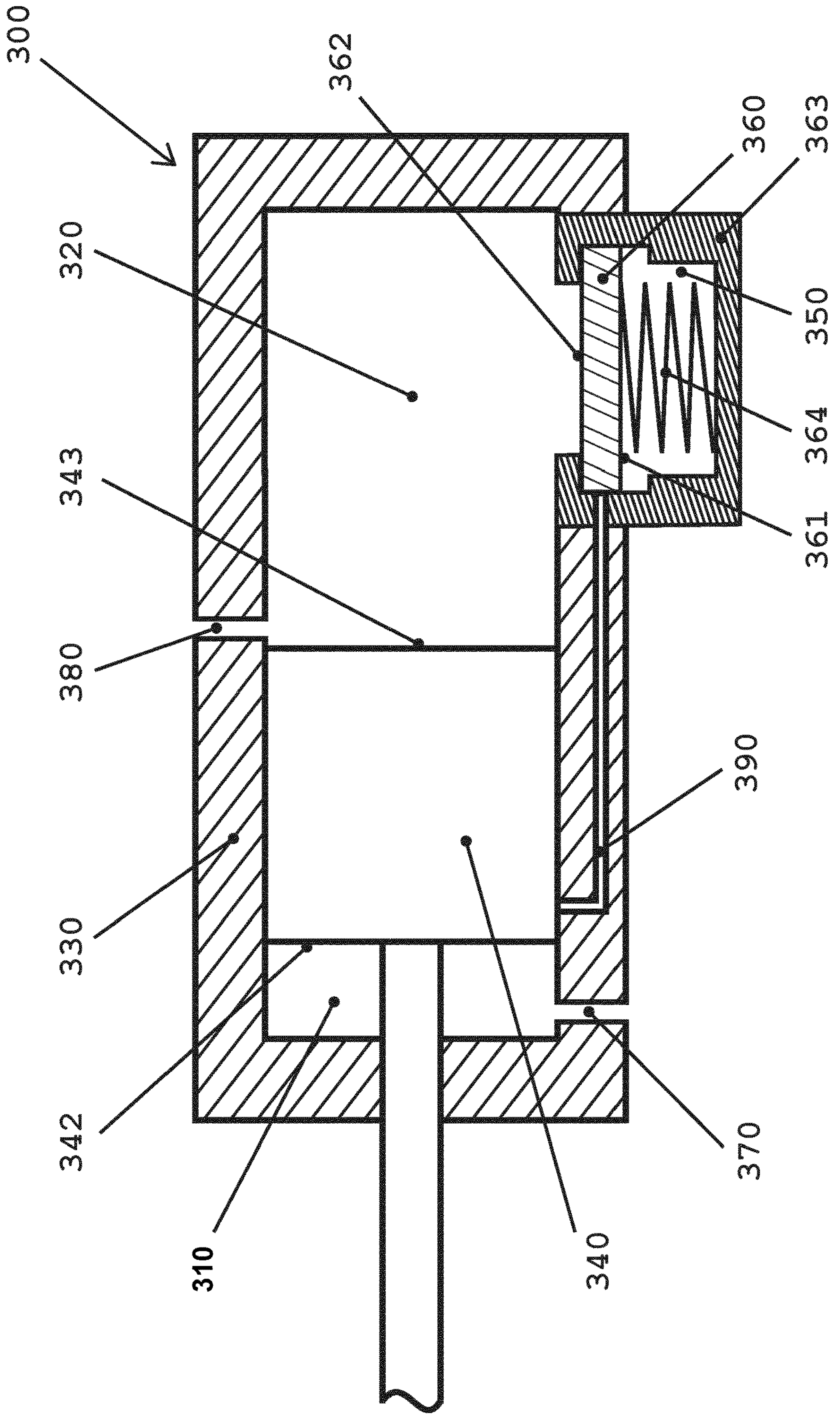
- FIG 3 -

- FIG 4 -
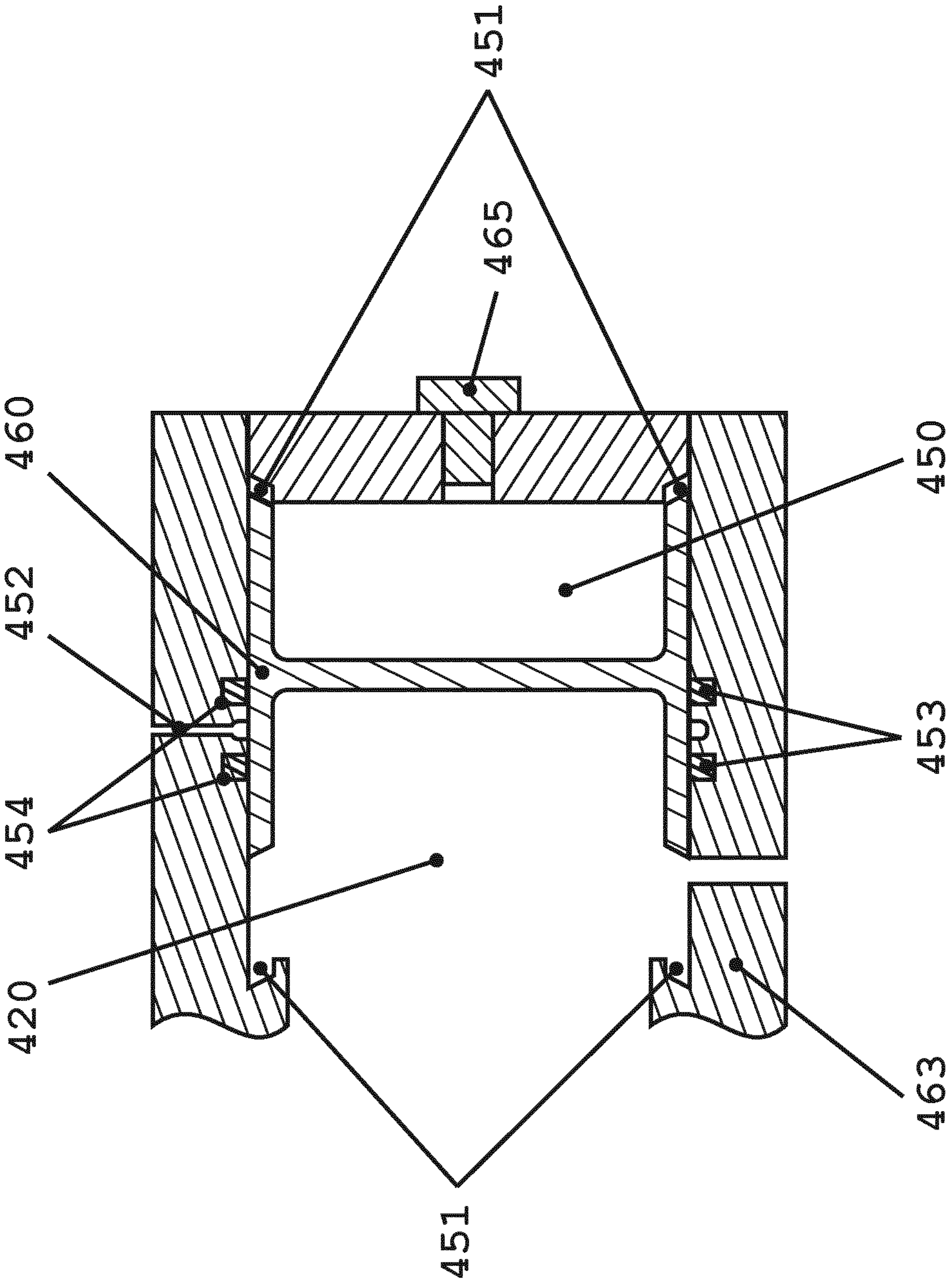

- FIG 5 -
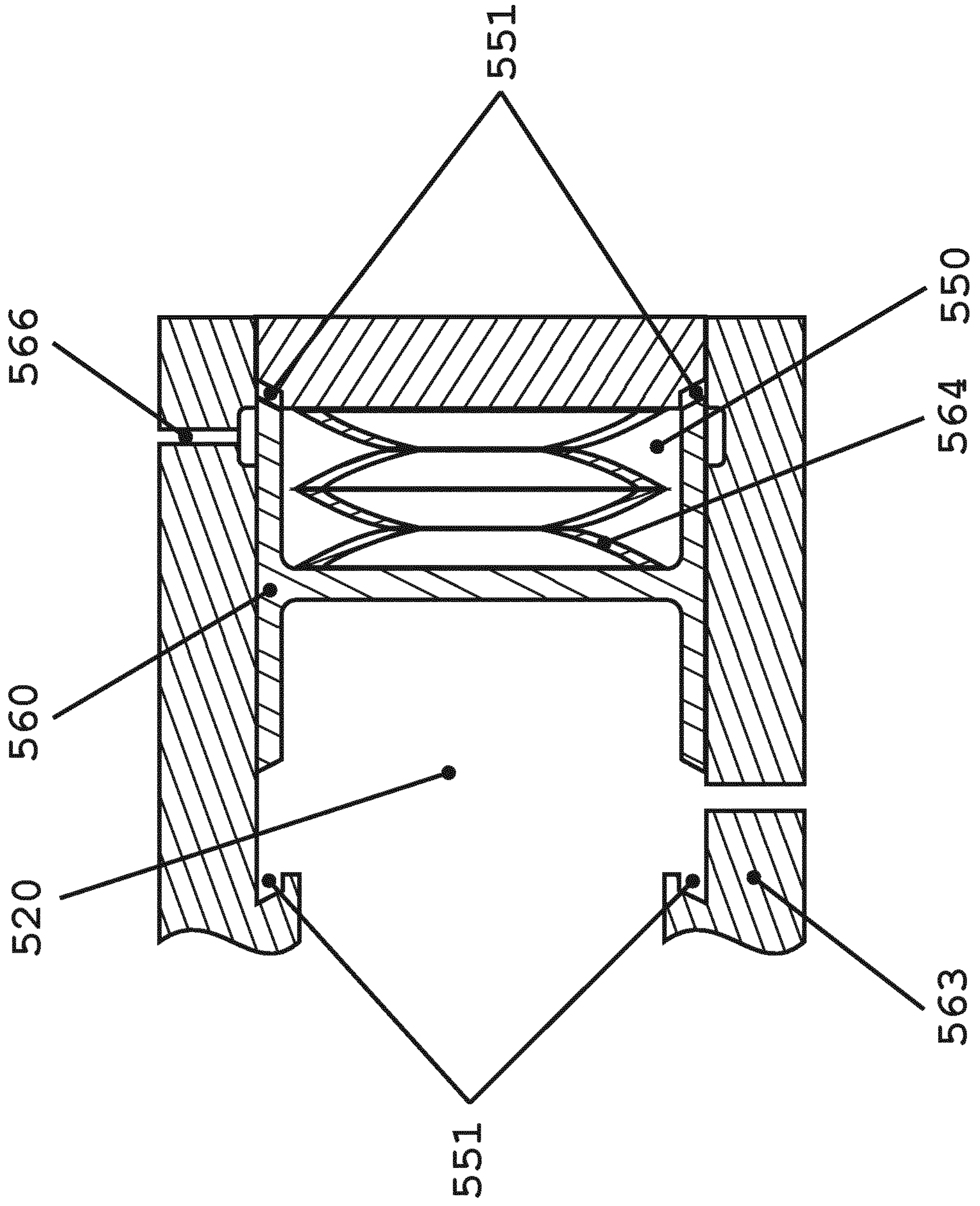

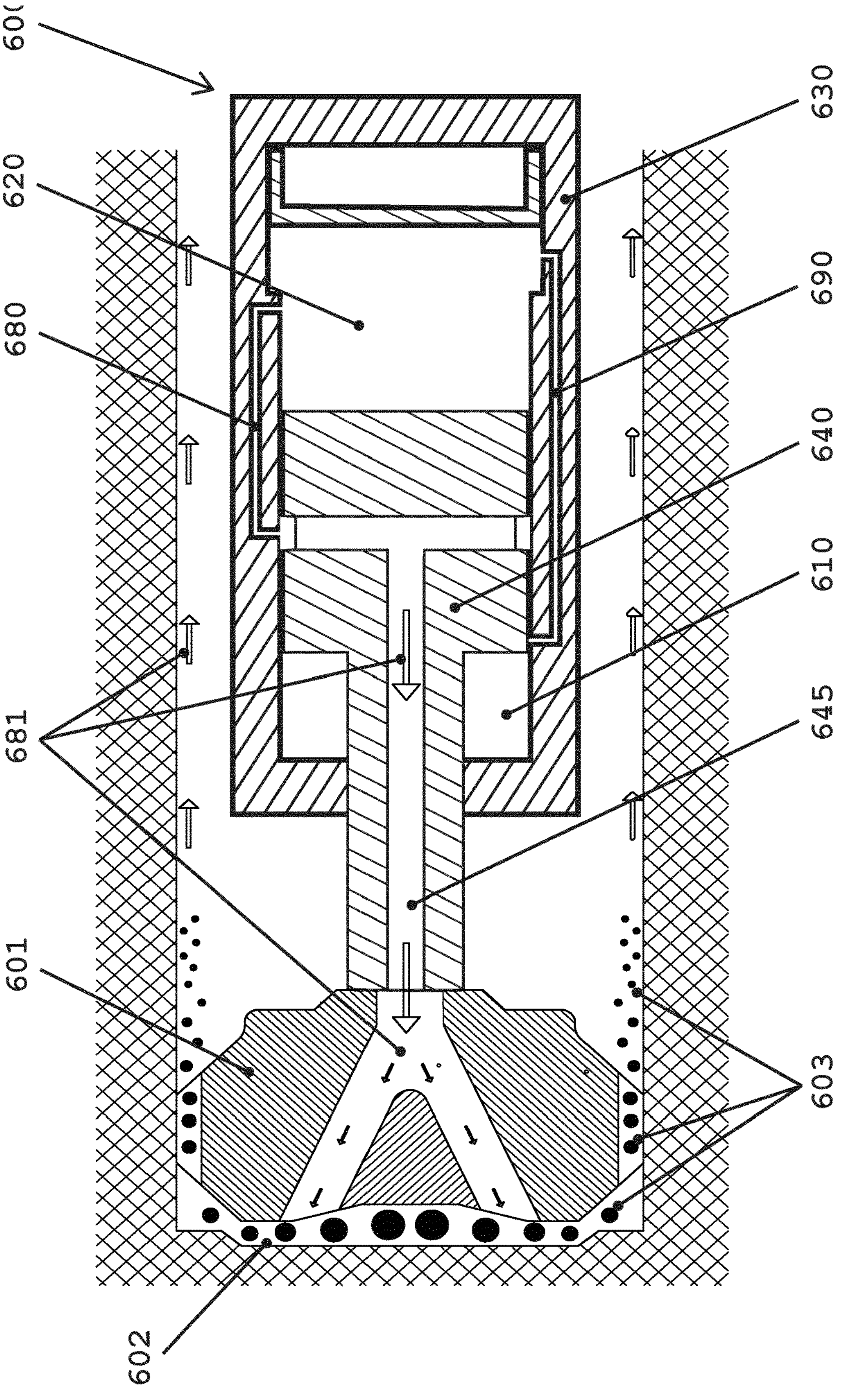
- FIG 6 -

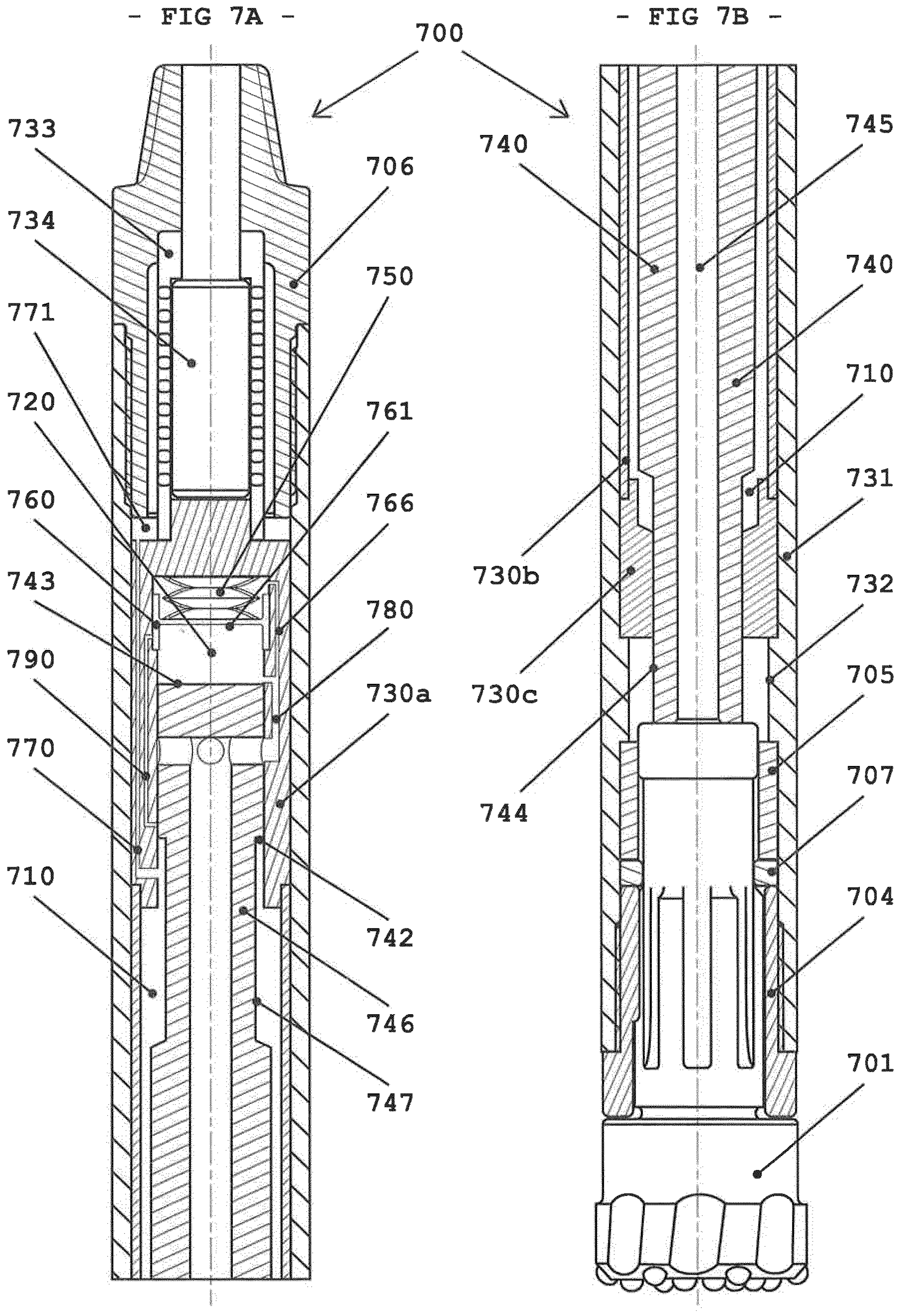
- FIG 7A -
- FIG 7B -
700
733
734
771
720
760
743
790
770
710
706
750
761
766
780
730a
742
746
747
740
745
740
710
731
730b
730c
732
705
744
707
704
701

HYDRAULIC IMPACT MECHANISM FOR USE IN EQUIPMENT FOR PROCESSING ROCK AND CONCRETE

The present invention relates to a valveless hydraulic impact mechanism, in particular for use in equipment for processing rock and concrete, and to drilling and hammering equipment comprising such hydraulic mechanisms.

BACKGROUND TO THE INVENTION

Rock processing requires both substantial energy to break into solid rock and high impact frequency to repeatedly hammer away at a work site.

Typically, hydraulic impact mechanisms are used in which pressure drives an impact piston forwards, the piston transferring its kinetic energy as a stress wave to a drill bit or other tool, which uses this impact energy to pulverise the rock. Reciprocating motion of the hammer piston in a cylinder bore in a machine housing is achieved by exposure of the piston to alternating pressure. The alternating pressure is most often obtained through a separate, gated, switch-over valve, and controlled by the position of the piston in the cylinder bore, which couples alternately to at least one of two drive chambers formed between the hammer piston and the cylinder bore to a line in the machine housing with driving fluid under pressure, and subsequently to a drainage line for driving fluid in the machine housing.

The manufacture of gate valveless impact mechanisms, also known as valveless mechanisms, has also been known for over 40 years. Instead of having a separate switch-over valve, the piston in a valveless impact mechanism also performs the work of the switch-over valve by opening and closing the supply and drainage of driving fluid under pressure during its motion in the cylinder bore, thus providing an alternating pressure as described above in at least one of two drive chambers separated by a drive part of the hammer piston.

One condition required for this to work is that channels, arranged in the machine housing for the pressurisation and drainage of a chamber, open out into the cylinder bore such that the openings are separated in such a manner that short-circuiting connection does not arise directly between the supply channel and drainage channel at any position of the reciprocating motion of the piston.

The connection between the supply channel and the drainage channel is normally present solely through the gap seal that is formed between the drive part and the cylinder bore. If this were not the case, large losses would arise, since driving fluid would be allowed to pass directly from high-pressure pump to drainage without any useful work being carried out. In order for it to be possible for the piston to continue its motion from the moment at which a channel for the drainage of a drive chamber is closed until a channel for the pressurisation of the same drive chamber is opened, it is necessary that the pressure in the drive chamber is changed slowly as a consequence of the piston motion. This can take place through the mechanism disclosed in WO 2012/138287, where the volume of at least one drive chamber is increased relative to what is normal for traditional impact mechanisms of the gate valve type. It is necessary that the volume is large due to the hydraulic fluid normally used having a low compressibility.

A valveless impact mechanism with two drive chambers is described in U.S. Pat. No. 4,282,937, where the pressure alternates in both of these chambers. Both drive chambers have large effective volumes due to being in continuous connection with volumes lying close to the cylinder bore.

A valveless hydraulic impact mechanism according to another principle is taught in SU 1068591 A, namely with alternating pressure in the upper drive chamber and constant pressure in the lower, which is the drive chamber that lies closest to the connection for the tool. In this case, the upper drive chamber, which is the one in which the pressure alternates, has a considerably larger volume than the lower drive chamber, in which the pressure is constant.

One problem with large drive chambers in which the pressure continuously alternates between system pressure and exhaust pressure, i.e., approximately atmospheric pressure, is that the machine housing itself tends to suffer from the formation of cracks as a consequence of metal fatigue. In order to avoid this, designs that have thick and complex castings with intermediate walls have until now been required, with a high cost and weight that follow from this.

A valveless impact mechanism disclosed in WO 2012/030272 proposes an arrangement with a first cylinder bore comprising the hammer piston in addition to the two drive chambers and piston gas accumulator(s), the gas accumulator comprising a second cylinder bore. This mechanism allows for smaller drive chamber volume.

The main problem with known valveless impact mechanisms is their instability and difficulty to initiate self-oscillation of the piston as the piston tends to adopt an equilibrium position when the system pressure is connected, rather than beginning self-oscillation. External systems like the start-up valve described in WO 2012/138288 have to be added in order to solve such issues.

In each of SU 1068591 A, WO 2012/030272 and WO 2012/138287, the piston has to be in a particular position in order to allow the cycle to initiate, otherwise the piston is stuck in equilibrium. That is, if the piston is pushed towards the accumulator side at the beginning, then the cycle cannot start properly because the piston remains in equilibrium at the level of the interconnection channel aperture. This causes system instability and makes it inappropriate for use. Rebound of the piston on the tool may also cause the system to remain stuck in equilibrium position for such systems.

Another problem is that the pressure channel connecting the drive chamber is closed during most of the downward piston movement, resulting in the possibility of a rapid loss of pressure and requiring the piston to be balanced using a complex arrangement of gas accumulators arranged in secondary cylinder bore(s) resulting in high cost and a negative impact on the mechanism's weight and reliability. These mechanisms do not produce sufficient impact energy as they don't provide enough acceleration to the piston, thus resulting in insufficient speed at the time of the piston impact.

Yet another problem with known valved and valveless impact mechanisms is that these are sensitive to the exhaust pressure. That is, when the exhaust pressure is significantly altered, the prior art impact mechanisms cease to function because the accumulator pressure has to be adapted to a particular exhaust pressure value. This makes such mechanisms unsuitable for operating in a context where the exhaust pressure is variable, for example in deep drilling where due to the water column exhaust pressure increases with depth.

JP S57 8091 relates to a hydraulic striking device where the piston acts like a switch-over valve by opening and closing the supply and drainage of driving fluid under pressure during its motion in the cylinder, thus providing an alternating pressure in one of two chambers separated by the piston. A port which connects the two chambers is opened by a valve which is mechanically pushed by the piston. One problem with this mechanism is unstable operation due to the piston's momentum and kinetic energy transfer while impacting the valve.

It is therefore an object of the present invention to provide a valveless hydraulic impact mechanism which alleviates the above disadvantages or at least provides a suitable alternative.

SUMMARY OF THE INVENTION

The present invention relates to a valveless hydraulic impact mechanism for use in equipment for processing rock or concrete or both. The mechanism according to the invention is cheaper, lighter, more performant, capable of working with variable exhaust pressure and at the same time able to initiate piston self-oscillation from any position of the piston. This is achieved with the means described in the independent claims. Further advantageous embodiments are described in the dependent claims.

Accordingly, in a first aspect the invention provides a valveless hydraulic impact mechanism for connection to a tool for processing rock or concrete or both, the valveless hydraulic impact mechanism comprising:

- a machine housing comprising a first cylinder bore and channels for containing driving medium during operation of the mechanism;
- a strike piston mounted within the first cylinder bore such that it can be displaced in the first cylinder bore to repeatedly execute a reciprocating motion relative to the machine housing during operation to impact a tool connectable to the mechanism, the strike piston comprising a drive part, a first drive surface and a second drive surface, wherein the second drive surface is larger than the first drive surface, wherein the drive part of the strike piston separates a first drive chamber from a second drive chamber formed between the strike piston and the machine housing such that the first drive surface is adjacent the first chamber and the second drive surface is adjacent the second drive chamber and wherein the drive chambers are arranged such that they contain a driving medium under pressure during operation,
- wherein the channels comprise a supply channel for supplying pressure to the first drive chamber, a connection channel for connecting the first drive chamber to the second drive chamber, and a drainage channel for connecting the second drive chamber to exhaust pressure,
- wherein the mechanism further comprises an accumulator and the machine housing optionally further comprises a second cylinder bore in fluid communication with the first cylinder bore, wherein the accumulator contains an accumulator piston mounted therein such that the accumulator piston can either be displaced in the first cylinder bore or, if present, in the second cylinder bore, and the accumulator further comprises an accumulator compartment containing a gas under pressure or a spring or metal bellows,
- wherein the strike piston and accumulator piston are solely in fluid communication such that the strike piston and accumulator piston do not make direct contact during operation of the mechanism,
- wherein the second drive chamber is formed between the strike piston and the accumulator piston,
- wherein the accumulator piston is configured to separate the driving medium in the second drive chamber from the accumulator compartment during operation of the mechanism, wherein the volume of the accumulator compartment varies with the frequency of the impact mechanism during operation as a consequence of the reciprocating motion of the accumulator piston,
- wherein the position for the opening of the drainage channel is arranged along the first cylinder bore so as to be opened and closed by a portion of the reciprocating strike piston, the position for the opening of the connection channel leading to the first drive chamber is arranged along the first cylinder bore so as to be opened and closed by a portion of the reciprocating strike piston and the position for the opening of the connection channel leading to the second drive chamber is arranged in the first or second cylinder bore so as to be opened and closed by a portion of the reciprocating accumulator piston such that, with the aid of the strike piston during its motion in the first cylinder bore and the accumulator piston in the first cylinder bore or, if present, the second cylinder bore, at least the second drive chamber acquires periodically alternating pressure for the maintenance of the reciprocating piston motion,
- wherein during operation of the mechanism, the reciprocating strike and accumulator pistons hold the second drive chamber closed for the supply or drainage of driving medium present in the second drive chamber along a distance between the opening of the drainage channel in association with a first turning point of the strike piston and the opening of the connection channel in association with a second turning point of the strike piston,
- wherein the motion of the strike piston along the distance between the opening of the drainage channel in association with the first turning point of the strike piston and the opening of the connection channel in association with the second turning point of the strike piston takes place during compression of the volume of the accumulator compartment, wherein the magnitude of the volume of the accumulator compartment is adapted to obtain a slow change in pressure in the second drive chamber along the distance between the channel openings.

During use of the impact mechanism, the strike piston exerts impacts either directly or indirectly onto the tool. However, the strike piston does not impact on the accumulator piston at any stage. Instead, the strike piston and accumulator piston are solely in fluid communication. During movement of the strike piston towards the second turning point, the accumulator piston follows the movement of the strike piston when both channels leading to the second drive chamber are closed due to the fluid in the first and second drive chambers not being compressible.

On movement of the strike piston towards the second turning point, the strike piston closes the drainage channel leading from the second drive chamber. The accumulator piston returns to its original position prior to the strike piston closing the drainage channel.

Continuing its movement towards the second turning point, after closing the drainage channel, the strike piston opens the connection channel leading to the first drive chamber. The connection channel is thus opened at one end by the strike piston in the first drive chamber and subsequently opened at the other end by the accumulator piston in the second drive chamber.

The accumulator piston keeps the connection channel open during the return movement of the strike piston to the first turning point, i.e., the supply of driving medium to the second drive chamber continues, allowing the strike piston to accelerate back to the first turning point.

As the strike piston moves from the first turning point to the second turning point, the accumulator piston keeps the volume of the second drive chamber constant.

The strike piston travels a distance d1 between the closure by the strike piston of the drainage channel leading from the second drive chamber and the opening by the accumulator piston of the connection channel in the second drive chamber.

The accumulator piston travels a distance d2 between the closure by the strike piston of the drainage channel in the second drive chamber and the opening by the accumulator piston of the connection channel leading to the second drive chamber.

Distance d1 is preferably equal to or longer than d2.

Preferably, the accumulator piston has a first drive surface adjacent the accumulator compartment and a second drive surface adjacent the second drive chamber. In this embodiment, the distance d2 is proportional to the product of d1 and the ratio of the strike piston first drive surface and the accumulator piston second drive surface.

In contrast to prior art mechanisms which require the piston to be in a particular position in order to allow the cycle to initiate and avoid the piston being stuck in equilibrium, the cycle of the impact mechanism of the present invention always initiates whatever initial position the strike piston is at.

If present, the second cylinder bore is in fluid communication with the first cylinder bore. The first cylinder bore may also be referred to as a main cylinder bore and the second cylinder bore as a further cylinder bore. There is no constraint on the location of the second cylinder bore with respect to the first due to the fluid communication between the bores. For example, the second cylinder bore does not need to be concentric with the first cylinder bore and may be at any angle thereto.

The arrangement of the channels conditions the sequence of the cycle and avoids direct short-circuiting of the supply and drainage channels. In a preferred embodiment, all the channels open out into the first cylinder bore. Alternatively, in the embodiment having a second cylinder bore, one end of the connection channel opens out into the first cylinder bore and the other end into the second cylinder bore.

The supply/drainage short-circuiting only occurs through a small gap between the strike piston and cylinder bore. This size of this gap is preferably less than 0.5 mm in order to achieve good efficiency. However, this is not considered to be limiting and gaps of other sizes are within the scope of the invention.

In order for it to be possible for the strike piston to continue its motion from the moment at which a channel for the drainage of a drive chamber is closed until a channel for the pressurisation of the same drive chamber is opened, the pressure in the drive chamber is changed slowly as a consequence of the strike piston motion.

The force on the strike piston is equal to the pressure in the first chamber applied on the first drive surface of the strike piston minus the pressure in the second drive chamber applied on the second drive surface of the strike piston. For the mechanism to function, the second drive surface S2 must be larger than the first drive surface S1.

The force on the strike piston becomes positive or negative according the pressure in the drive chambers, with the strike piston moving to the first or second turning point accordingly. The change in the direction of motion of the strike piston is achieved when the resultant force is zero, i.e., the pressure in the first chamber is equal to pressure in the second chamber multiplied by the surface ratio of the second drive surface:first drive surface. The change in the direction of motion of the strike piston direction is not immediate due to the fact that when the resultant force changes direction the strike piston acceleration becomes positive or negative with a progressive impact on the speed.

A fast pressure change in the second drive chamber would reverse the motion direction before the connection channel is opened, leading to a system in equilibrium, i.e., to an unstable cycle or to the lack of a cycle.

When the second drive chamber is pressurised, i.e., when the connection channel is fully opened, the accumulator piston is pushed under the effect of the pressure differential between the second drive chamber and the accumulator. The accumulator piston maintains its position and the connection channel remains open while the strike piston returns to the first turning point. Pressure is continuously applied on the second drive surface until the strike piston reaches the connection channel opening leading to the first drive chamber, thus closing the pressure supply to the second drive chamber. The strike piston has already acquired a consistent kinetic energy at this time.

When the strike piston closes the connection channel opening in the first drive chamber, the accumulator piston remains where it is until the second drive chamber drops in pressure. The accumulator piston then accelerates back to its initial position, closing the connection channel opening in the second drive chamber. That is, the original accumulator piston position is not reached until after the strike piston reaches the first turning point.

The opening of the drainage channel occurs after the closure of the connection channel opening leading to the first drive chamber in order to avoid short-circuiting and loss of efficiency. With the drainage channel open, the strike piston moves along a predetermined distance before impacting on a tool connected to the mechanism, with the predetermined distance being set by the machine requirements. During these two steps, the pressure in the first drive chamber drops, the accumulator releases the stored energy limiting this pressure drop because the accumulator piston moves once the pressure of the first drive chamber becomes lower than the pressure of the accumulator. As a consequence, when the strike piston hits the tool, it has maintained a consistent kinetic energy.

The valveless hydraulic impact mechanism according to the invention provides very high system efficiency and impact frequency, and as a consequence allows the speed of drilling to be drastically improved.

During operation of the mechanism, the connecting channel does not constantly provide the supply pressure as it is switched by the piston itself: As a result, in the mechanism according to the invention, there is no constant supply channel to be switched by the accumulator piston, this being the reason why the mechanism is described as “valveless”, and leaks that would arise from a system comporting a constant supply channel near to a chamber at the exhaust pressure are reduced, thus increasing the global efficiency of the system.

The valveless hydraulic impact mechanism according to the invention is not sensitive to exhaust pressure variations. The mechanism according to the invention is thus suitable for applications where the exhaust pressure is variable, such as deep drilling with a fluid column which generates a growing pressure with the depth. This is further enabled by the ability to use water or unfiltered fluid as process fluid in the mechanism according to the invention.

The high hydraulic efficiency of the mechanism results in increased operating time and/or depth before efficiency loss due to component wear.

Impact frequencies of over 150 Hz can be reached by the valveless hydraulic impact mechanism according to the invention, enabling the input of resonance in at least a portion of the drill string to achieve a very high rate of penetration.

Due to the compactness of the valveless hydraulic impact mechanism according to the invention, the mechanism can be enclosed in a tube and inserted down the hole, allowing for percussion close to the bottom of the hole.

The hydraulic impact mechanism according to the invention works with constant pressure in one chamber. This is preferably achieved by the chamber being connected to a source of constant pressure during the complete stroke cycle. It is advantageous to include a hydraulic accumulator on the supply line to ensure an optimum efficiency of the system.

The hydraulic impact mechanism according to the invention initiates strike piston self-oscillation independent of the strike piston position and operates along a stable cycle without interruption. This arises from the fact that the supply channel has the ability to remain open during the movement of the strike piston between the second turning point and the opening of the drainage channel.

Due to the supply channel remaining open during the movement of the piston between the second turning point and the opening of the drainage channel, the hydraulic impact mechanism according to the invention generates a consistent impact energy thus allowing the strike piston to be accelerated by the supply pressure during this distance, without pressure loss in the second drive chamber.

The hydraulic impact mechanism according to the invention is easier and cheaper to manufacture and more compact than prior art mechanisms. For example, the accumulator piston and strike piston may be configured without any restriction of concentricity or coaxiality between them, thus simplifying the cylinder manufacturing which does not require a high geometric precision manufacturing and can be done as an assembly.

The number of ports and connecting channels is reduced over prior art mechanisms, simplifying the manufacture and reducing the cost.

The accumulator piston shape can be freely configured, a low mass can be easily achieved without the need of complex manufacturing processes. Furthermore, the accumulator piston is not subject to impacts, allowing a simple and cheaper structure and wide choice of construction materials.

The accumulator chamber may be integrated in the main cylinder bore, or in a further cylinder bore in fluid communication with the main cylinder bore, thus giving more possibilities of spacial arrangements according dimensional constrains of the whole mechanism.

The shape, location and size of the second drive chamber, as well as the connecting channel may be configured with improved freedom, allowing a reduction in manufacturing costs, and allowing the mechanism size to be limited, thus allowing, for example, placement in a limited space, like a tubular arrangement for deep hole drilling.

In a preferred embodiment, the strike piston is provided with an internal channel which communicates with the drainage channel, enabling the use of the process fluid for the flushing of process cuttings out of a borehole. In this embodiment, the drainage channel located in the machine housing connects the second drive chamber to the channel within the strike piston rather than directly to exhaust pressure. In other words, the connection from the second drive chamber to the exhaust pressure is indirect as it involves both the drainage channel and the piston exhaust channel.

The accumulator piston does not need to switch the communication of two ports as it is functional with only one channel communicating with it, this feature limiting its length and thus its mass.

The accumulator piston may be of any shape provided it keeps the second drive chamber and accumulator separate from each other and allows the opening of the connection channel leading to the second drive chamber. Preferred shapes for the accumulator piston are those with a H- or U-shaped cross section, thus reducing weight and increasing acceleration. This embodiment allows the accumulator piston to recover its position in a drastically shorter time, allowing the hydraulic cycle to be stable and continuous and also permits easy manufacture of the accumulator piston at a reasonable cost.

In light of the fact that the accumulator piston never impacts the piston, operation of the accumulator pistons occurs without heavy mechanical stress, thus allowing the use of lighter density material for the manufacture of the accumulator piston, allowing to further reduce its mass.

The accumulator preferably comprises at least one sealing, i.e., at least one seal on the hydraulic side and at least one seal on the gas or bellows side, with or without a drainage channel.

Alternatively, the accumulator comprises a double sealing plus drainage channel. In this embodiment, the cylinder bore in which the accumulator is located preferably comprises at least two groves for mounting of the sealing elements, particularly preferably wherein the accumulator comprises a channel that opens out into the cylinder bore between the two sealing elements for drainage of driving medium.

In a preferred embodiment, the accumulator further comprises a dampening chamber to accelerate the braking of the accumulator piston before the turning points of the accumulator piston, preferably wherein the accumulator piston and the dampening chambers are configured such that, when the accumulator piston enters the dampening chamber, a gap of width less than 0.5 mm arises between them, this gap constituting a gap seal between the dampening chamber and the second drive chamber or accumulator chamber.

In a preferred embodiment, the accumulator is concentrically located in the first cylinder bore and contains an accumulator piston mounted therein such that the accumulator piston can be displaced in the first cylinder bore.

The accumulator is preferably a gas type, spring type or bellows type accumulator. However, this is not considered to be limiting and other types of piston accumulator could be used in the mechanism according to the invention, including, but not limited to, magnetic piston accumulators.

In the embodiment wherein the accumulator is a spring or bellows type accumulator, the sealing is optional and preferably replaced by a gap of less than 0.5 mm between the accumulator piston and bore in which it is to be displaced.

In the embodiment wherein the accumulator is a spring accumulator, the accumulator preferably further comprises an exhaust channel that opens out into the accumulator for connection with exhaust pressure thus allowing the required change of volume. This enables proper operation under any exhaust pressure conditions.

The hydraulic impact mechanism described hereinabove may be an integrated part of equipment for processing rock and concrete, such as rock drills and hydraulic breakers. These machines and breakers are preferably mounted during operation of a carrier that comprises one or more of the following means: means for alignment, means for positioning, and means for feeding the drill or breaker against the processed rock or concrete elements, and further, means for guiding and monitoring the process. Further, means for the propulsion and guidance of the carrier itself are preferably also included. Such a carrier may be a rock drill rig.

In a further aspect therefore, the invention provides a rock drill, hydraulic breaker and in-hole rock drilling machine, each independently comprising the hydraulic impact mechanism as described hereinabove.

In a further aspect, the invention provides a carrier comprising the rock drill, hydraulic breaker or in-hole drilling machine, the carrier further comprising one or more of the following means: means for alignment, means of positioning, and means for feeding the drill or hydraulic breaker against the processed rock or concrete elements.

In a further aspect, the invention provides a rock drill rig comprising the rock drill described above.

BRIEF DESCRIPTION OF THE DRAWINGS

Certain preferred embodiments of the present invention will now be described, by way of example only, with reference to the accompanying drawings in which:

FIGS. 1*a* to 1*d* show cross-sectional views of a preferred valveless hydraulic impact mechanism according to the present invention;

FIG. 2 shows a cross-sectional view of another alternative preferred hydraulic impact mechanism according to the present invention;

FIG. 3 shows a cross-sectional view of another alternative preferred hydraulic impact mechanism according to the present invention, wherein the accumulator is placed outside the main cylinder bore, the accumulator bore enclosing a metal bellows or spring accumulator of piston type;

FIG. 4 shows a cross-sectional view of a cylinder bore enclosing a gas accumulator of piston type with dampening chambers at the two turning points of the accumulator piston;

FIG. 5 shows a cross-sectional view of a cylinder bore enclosing a metal bellows or spring accumulator of piston type with dampening chambers at the two turning points of the accumulator piston;

FIG. 6 shows a cross-sectional view of a preferred mechanism adapted for an open hydraulic circuit with a piston comprising an exhaust channel for the process fluid; and FIGS. 7A and 7B show a cross-sectional view of an in-hole rock drilling machine incorporating an alternative preferred valveless hydraulic impact mechanism according to the present invention, with FIG. 7A showing the rear portion of the machine and FIG. 7B the front portion of the machine and the intermediate part of the machine not being shown.

DETAILED DESCRIPTION

Various embodiments of the present invention will be described in detail with reference to the drawings, where like reference numeral represent like parts and assemblies throughout the several views. The protective scope of the invention is not to be considered to be limited to these embodiments: it is defined by the claims.

Referring to the drawings, FIGS. 1*a* to 1*d* schematically show a preferred hydraulic impact mechanism 100 according to the invention for connection to tool T for processing rock or concrete or both. As shown, hydraulic impact mechanism 100 comprises a machine housing with cylinder bore 130, strike piston 140, first drive chamber 110, second drive chamber 120, accumulator chamber 150 and accumulator piston 160, accumulator piston 160 being of U-shaped cross section. Pressure channel 170, exhaust channel 180 and connection channel 190 for containing driving medium under pressure during operation of the mechanism open out into cylinder bore 130.

Strike piston 140 comprises piston rod 144 and drive part 141, with first drive surface 142 being at the end of the drive part closest to piston rod 144 and second drive surface 143 being at the other end of drive part 141. Drive part 141 of strike piston 140 separates first drive chamber 110 from second drive chamber 120. First drive chamber 110 is connected by connection channel 190 to second drive chamber 120 and second drive chamber 120 is formed between strike piston 140 and accumulator piston 160.

Strike piston 140 is mounted such that it can be displaced in the machine housing within cylinder bore 130 such that it repeatedly executes a reciprocating motion relative to the machine housing during operation and in this way exerts impacts either directly or indirectly onto tool T connected to mechanism 100. As shown in FIGS. 1*a* to 1*d*, strike piston 140 moves between a lower turning point and an upper turning point.

There is alternating pressure on the upper side of strike piston 140, i.e., in drive chamber 120, and constant pressure on the lower side thereof, i.e., the side that is facing towards connected tool T.

Channels 170, 180, 190 with the aid of strike piston 140 during its motion in cylinder bore 130, open and close into at least second drive chamber 120 such that at least second drive chamber 120 acquires periodically alternating pressure for the maintenance of the reciprocating piston motion.

FIG. 1*a* shows strike piston 140 at the first turning point. As the Figure is drawn, this turning point may also be referred to as the lower turning point. First drive chamber 110 is connected to system pressure SP through pressure channel 170. In the embodiment shown in FIG. 1*a*, second drive chamber 120 is connected to exhaust pressure EP through exhaust channel 180. In this way, the force acting upon first drive surface 142 of strike piston 140 will drive piston 140 upwards, closing exhaust channel 180 and building up pressure in chamber 120. As can be seen from FIG. 1*b*, as strike piston 140 moves upwards, accumulator piston 160 also moves upwards, because the force acting on surface 162 of accumulator piston 160 exceeds the force generated by accumulator compartment 150 on first drive surface 161 of accumulator piston 160, keeping the volume of drive chamber 120 constant.

FIG. 1*c* shows strike piston 140 at the second turning point. As the Figure is drawn, this turning point may also be referred to as the upper turning point. Since the pressure in drive chamber 120 is built slowly and remains lower than the equilibrium pressure given by the system pressure and the ratio of the areas of second drive surface 143 and first drive surface 142 of strike piston 140, strike piston 140 and accumulator piston 160 will reach sufficiently far for connection channel 190 to open the connection between drive chambers 110 and 120, and the system pressure becomes prevalent in second drive chamber 120. Since drive surface 143 of strike piston 140 is greater than drive surface 142, strike piston 140 is now driven downwards as shown in FIG. 1*d*.

Due to the force acting on surface 162 being greater than the force generated by accumulator 150, accumulator piston 160 is driven to its maximum course keeping channel 190 open during the downwards movement of strike piston 140. Connection channel 190 is in this way first closed, and exhaust channel 180 is later opened, and the pressure in second drive chamber 120 falls. Accumulator piston 160 is then driven back to its lower position due to the force applied on surface 161 being greater than the force applied on surface 162. A new cycle thus commences with piston 140 again being driven up by the system pressure acting on drive surface 142.

It is not necessary for drive chambers 110, 120 to be large, since the compressibility arises from accumulator 150. The dimensions of chamber 120 are set based on space requirements for channels 180 and 190.

FIG. 2 schematically shows another alternative preferred hydraulic impact mechanism 200 according to the invention for connection to a tool for processing rock or concrete or both. In mechanism 200, when viewed as depicted, there is alternating pressure on the upper side of the piston and constant pressure on its lower side, i.e., the side that is facing towards the connected tool (not shown). This embodiment shows a more compact, annular-shaped, accumulator piston 260 and accumulator spring 264. The movement of accumulator piston 260 is reversed with respect to accumulator piston 160 of FIGS. 1*a* to 1*d*. However, the function of accumulator piston 260 opening connection channel 290 remains the same as accumulator piston 160 opening connection channel 190. In other words, the direction in which the accumulator piston moves is not limiting on the invention.

In mechanism 200, similarly to mechanism 100, first drive chamber 210 is connected to system pressure through pressure channel 270. As FIG. 2 has been drawn, second chamber 220 is connected to exhaust pressure through channel 280. Due to the spring force exceeding the force on drive surface 262, accumulator piston 260 moves to the right until it reaches its maximum position on the right. The force that acts upon drive surface 242 drives hammer piston 240 to the right. This leads to exhaust channel 280 being closed, and pressure is built up in chamber 220. As hammer piston 240 moves to the right, accumulator piston 260 moves to the left because the force acting on surface 262 exceeds the force generated by accumulator chamber 250 on surface 261, keeping the volume of chamber 220 constant. The pressure in chamber 220 is built slowly remaining lower than the equilibrium pressure given by the system pressure and the ratio of the areas of drive surfaces 243 and 242 resulting in piston 240 and accumulator piston 260 reaching sufficiently far for connection channel 290 to open the connection between drive chambers 210 and 220, and the system pressure then becomes prevalent in second chamber 220. Due to drive surface 243 being greater than drive surface 242, hammer piston 240 is then driven to the left.

Since the force acting on the surface 262 is greater than the force generated by accumulator 250, accumulator piston 260 is driven to the left to its maximum course keeping channel 290 open during movement of strike piston 240 towards the left. Connection channel 290 is in this way first closed by strike piston 240, and exhaust channel 280 is later opened, and the pressure in second chamber 220 falls. Accumulator piston 260 recovers its initial position on the right due to the force applied on surface 261 being greater than the force applied on surface 262. A new cycle thus commences with hammer piston 240 again being driven to the right by the system pressure acting on the drive surface 242.

It is not necessary for drive chambers 210, 220 to be large, since the compressibility arises from accumulator 250. The dimensions of chamber 220 are set based on space requirements for the channels.

A preferred working machine may have the following exemplary dimensions:

Diameter of preferred strike piston at first drive part: 45 mm
Diameter of piston rod: 38 mm
Length of first drive part: 100 mm
Weight of piston: 5.26 kg
Diameter of preferred accumulator piston: 60 mm
Weight of accumulator piston: 0.18 kg
Inlet pressure: 250 bar
Process fluid flow: 140 l/min
Exhaust Pressure: 1 bar
Distance between accumulator downward turning point and connection channel opening: 6 mm
Distance between strike piston downward turning point (impact point) and exhaust channel closure and connection channel opening: 3.5 mm
Gas charged accumulator 550:
Volume: 85 $cm^3$
Pre-charging pressure: $30\times10^5$ Pa.

A machine comprising the above delivers the following output:

Cycle frequency: 160 Hz
Strike piston speed at impact: 11.2 m/s
Impact Energy: 330 J
System Efficiency: >90%

For the above machine, with a gap between the piston and cylinder bore of 0.05 mm and a fluid dynamic viscosity at 40° C. of 0.02816 kg/ms, the leak would be about 0.78 l/min. In the case of a system with such dimensions and a flow of 140 l/min, the impact on the efficiency is 0.78/140, i.e., 0.56%.

A gap larger than 0.05 mm would be acceptable for other configurations such as deep drilling with water or mud, provided the system efficiency is larger than zero. For example, for a machine with diameter piston drive=200 mm, drive length=500 mm, delta pressure=250 bar, piston/cylinder gap=0.25 mm, bentonite drilling mud dynamic viscosity of 0.012 kg/ms, the leak would be 204 l/min. In the case of a system with such dimensions and a flow of 600 l/min, the impact on the efficiency is 204/600=34% which is considered acceptable.

With regard to the distance travelled by the accumulator and strike pistons, for the machine above:

$$d2 = d1 \times \text{surface (143) of strike piston (140)/surface (162) of accumulator piston (150)} = d1 \times (\text{strike piston diameter})^2 / (\text{accumulator piston diameter})^2 = d1 \times 45^2/60^2 = 0.5625\ d1$$

The ability to choose different diameters permits drastic reduction of the accumulator piston stroke length.

The device according to the invention allows the accumulator piston stroke length to be accordingly chosen, preferably shorter than the piston acceleration motion. This feature allows the accumulator piston to recover its position in a drastically shorter time, allowing the hydraulic cycle to be stable and continuous.

FIG. 3 shows a cross-sectional view of preferred hydraulic impact mechanism 300 according to the present invention, wherein accumulator 350 is placed outside main cylinder bore 330, with accumulator bore 363 enclosing spring accumulator 364 of piston type. In mechanism 300, similarly to mechanisms 100 and 200, first drive chamber 310 is connected to system pressure through pressure channel 370. As FIG. 3 has been drawn, second chamber 320 is connected to exhaust pressure through channel 380. As shown in FIG. 3, piston 340 separates first drive chamber 310 from second drive chamber 320. Chamber 320 extends within both main cylinder bore 330 and accumulator bore 363 with connection channel 390 opening out into second drive chamber 320 via accumulator bore 363. In the embodiment shown, drive surfaces 361, 362 of accumulator piston 360 are perpendicular to drive surfaces 342, 343 of strike piston 340. However, this is not considered to be limiting and accumulator bore 363 is not required to be perpendicular to main cylinder bore 330.

FIGS. 4 and 5 show details of preferred embodiments of accumulator 150, 250, 350 within second cylinder bore 463, 563. Accumulator 150, 250, 350 may be a gas accumulator 450 as shown in FIG. 4 or a spring type or bellows type accumulator 550 as shown in FIG. 5. Further alternative accumulators may also be possible and the invention is not considered to be limited to accumulators 450 or 550.

Pre-charging of the gas pressure of accumulator 450 preferably takes place through connection 465 (shown in FIG. 4 as an accumulator gas plug). This is not considered to be limiting and only represents one example of how the gas accumulator may be charged.

As shown in FIG. 4, accumulator piston 460 is received in dampening chambers 451 within accumulator bore 463 adjacent second drive chamber 420 and the accumulator chamber in such a manner that the speed is reduced before the maximum course of accumulator piston 460 is reached, avoiding rebound of accumulator piston 460. This dampening system considerably increases the lifetime of accumulator piston 460.

Seal grooves 454 are formed in accumulator bore 463 to accommodate seals 453. Drainage channel 452 is located between seals 454 in order to avoid the mixing of gas and process fluid.

In FIG. 5, exhaust channel 566 connects accumulator chamber 550 to the exhaust to keep accumulator chamber 550 at exhaust pressure during the whole cycle, thus allowing its change of volume and proper operation of the system regardless of the exhaust pressure conditions, i.e., under any exhaust pressure conditions.

As shown in FIG. 5, accumulator 560 is of bellows type with bellows 564 in chamber 550. Accumulator piston 560 is received in dampening chambers 551 within accumulator bore 563 adjacent second drive chamber 520 and accumulator chamber 550 in such a manner that the speed is reduced before the maximum course of accumulator piston 560 is reached in any direction, avoiding rebound of accumulator piston 560. This dampening system considerably increases the lifetime of accumulator piston 560.

FIG. 6 shows a preferred arrangement 600 adapted for an open hydraulic circuit, the process fluid being in this case water or drilling mud. In the embodiment shown, second drive chamber 620 is on the right and first drive chamber 610 is on the left. Connection channel 690 is located in cylinder bore 630. Exhaust channel 680 is connected to channel 645 in strike piston 640. Channel 645 permits process fluid 681 to be driven, usually through drill bit 601, towards the bottom of borehole 602. In this way, the process fluid is ejected, and flushes out cuttings 603 from borehole 602, i.e., rock and earth material debris resulting from the drilling process.

Exhaust channel 680 is opened and closed by movement of strike piston 640.

In FIG. 6, strike piston 640 is shown at its downward turning point, i.e., the first turning point. Exhaust channel 680 is open and connects second drive chamber 620 to exhaust pressure via piston channel 645. As strike piston 640 moves up, i.e., towards the second turning point, it closes exhaust channel 680, thus closing the communication of second drive chamber 620 with exhaust pressure.

The in-hole rock drilling machine 700 shown in the FIGS. 7A and 7B has a housing, the main part of which is a cylindrical tube 731 that has an interior shoulder 732 and interior threads in each end. A drill bit 701 is maintained in housing 731 by means of sleeve 704 screwed into tube 731. Sleeve 704 is in splined connection with drill bit 701. Drill bit 701 is guided in the housing by sleeve 704 and guiding bushing 705. Stop ring 707 prevents drill bit 701 from falling out. Drill bit 701 is thus axially movable within a limited distance in tube 731 and cannot turn relative to the housing. Drill bit 701 has an axial flushing fluid passage (not shown) that ends in flushing fluid ejecting holes in its front surface.

Cylinder bushing 730*c* abuts shoulder 732 and cylinder sleeve 730*b* abuts cylinder bushing 730*c*. Cylinder head 730*a* abuts cylinder sleeve 730*b* and tubular filter support 733 enclosing filter 734 abuts cylinder head 730*a*.

Backhead 706 of the machine housing is screwed into the rear end of tube 731 and is arranged to axially clamp parts 733, 730*a*, 730*b*, 730*c* against shoulder 732.

Parts 733, 730*a*, 730*b*, 730*c* act together as a spring and their cumulative length is such that they are compressed when backhead 706 is screwed into place. As an example, the overall axial compression is preferably between about 0.4 mm and about 2 mm. Cylinder sleeve 730*b* contributes most to this compression because of its dominating length and its comparatively small steel area in its cross section. Cylinder sleeve 730*b* is adapted to be compressed by at least 0.3 per mill of its length, preferably by from about 0.8 to about 3.0 per mill of its length.

Filter support 733 may have about the same cross-sectional area of steel as cylinder sleeve 730*b*, but it is shorter and its contribution to the spring action is therefore smaller. Backhead 706 is arranged to be screwed to a conventional drill tubing that transmits rotation to drilling machine 700 and also transmits hydraulic drive fluid in the form of pressurised water or drilling fluid to drilling machine 700.

In operation, annular space 771 at the back of cylinder head 730*a* is thus continuously filled with filtered fluid under pressure. When assembling machine 700, all parts 733, 730*a*, 730*b*, 730*c* are loosely placed on top of one another which makes assembly simple and reduces the demand on axial tolerances. The added tolerance is taken up by the axial elastic compression. All the parts slide easily in machine housing and are therefore easy to remove when machine 700 is to be disassembled.

A valveless impact mechanism according the invention is enclosed in the cylinder formed by parts 730*a*, 730*b* and 730*c*. Piston 740 with through channel 745 has its front end guided in cylinder bushing 730*c*. Top end 746 of piston 740 extends into the drive chamber of cylinder head 730*a*. Top end 746 of piston 740 is thus guided by the walls of cylinder head 730*a*. Top end 746 of piston 740 is provided with groove 747 with first drive surface 742. Piston 740 is guided at its top end 746 by cylinder head 730*a*, and at its rod 744 by cylinder bushing 730*c*. The actual length of the guiding surfaces is defined by the guiding surfaces of cylinder bushing 730*c* and cylinder head 730*a* and takes up only a minor part of the length of piston 740. The actual length of guiding is less than 20% of the length of piston 740. The central part of piston 740 is located between these guiding surfaces and has a wide clearance to cylinder sleeve 730*b* of tube 731.

Preferably, in order to ensure the piston is as heavy as possible, the central part of piston 740 is radially enlarged with respect to its guided end portions. The guiding surface of piston 740 sliding against cylinder bushing 730*c* has a smaller diameter than the guiding surface against cylinder head 730*a* so that piston 740 has a differential area in cylinder head 730*a* that is formed axially between cylinder bushing 730*c* and cylinder head 730*a*. If groove 747 and the bottom guiding surface have the same diameter, then this differential area is represented by the area of drive surface 742 of groove 747. This differential area is smaller than drive surface 743 in head cylinder chamber 720.

Cylinder head 730*a* comprises accumulator chamber 750 and accumulator piston 760.

Accumulator 750 shown in FIG. 7A is of metal bellows type, however this is not to be considered limiting and other typologies of accumulator like for example gas or spring type are also suitable.

The pre-load force of the accumulator is adapted according the system pressure and the differential of areas 742 and 743.

Exhaust channels 766 and 780 connect accumulator chamber 750 to the exhaust in order to allow its change in volume, thus also allowing impact mechanism 700 to work independently of the exhaust pressure.

Cylinder 730*a* comprises connection channel 790 constantly connecting chamber 710 to system pressure chamber 771. The openings of connection channel 790 are controlled by piston 740 and accumulator piston 760. Connection channel 790 connects chamber 720 to chamber 710.

The openings of exhaust channel 780 are controlled by piston 740 and exhaust channel 780 connects chamber 720 to the exhaust. The relative axial positions of the openings of channels 780 and 790 can be varied.

First drive chamber 710 is supplied by pressure channel 770.

A cycle of the operation of machine 700 will now be described:

First drive chamber 710 is constantly connected to system pressure. As shown in the preferred embodiment shown in FIGS. 7A and 7B, second chamber 720 is connected to the exhaust pressure through channel 780 and piston channel 745. The force that acts upon the drive surface 742 will, in this way, drive piston 740 upward. This leads to exhaust channel 780 being closed, and a pressure is built up in chamber 720.

As piston 740 moves up, accumulator piston 760 also moves due to the force acting on its lower surface 761 exceeding the force generated by accumulator 750 on the upper surface of accumulator piston 760, keeping the volume of chamber 720 constant.

Due to the fact that the pressure in chamber 720 is built slowly, remaining lower than the equilibrium pressure given by the system pressure and the ratio of the areas 743 and 742, piston 740 and accumulator piston 760 will reach sufficiently far for connection channel 790 to open the connection between drive chambers 710 and 720, and the system pressure becomes prevalent in second chamber 720.

Since surface 743 is greater than drive surface 742, piston 740 will now be driven downward. Since the force acting on surface 761 is greater than the force generated by accumulator 750, accumulator piston 760 will be driven up to its maximum course keeping channel 790 open during the piston downward movement and thus allowing piston 740 to accelerate and impact.

Accumulator piston 760 is dampened by its walls cutting off a dampening chamber so that the accumulator piston is braked before it lands in its upper position and it will therefore not tend to rebound. Reaching the end of its downward movement, piston 740 first closes connection channel 790, and exhaust channel 780 is successively opened, and the pressure in second chamber 720 falls, the process fluid being driven through piston channel 745 and drill bit 701. The process fluid flows out of drive chamber 720 with high energy and is thus utilised as a flushing fluid for flushing the debris out of the borehole.

Accumulator piston 760 falls back in its lower position and is dampened by its walls cutting off a dampening chamber so that the accumulator piston is braked before it lands in its turning position and it will therefore not tend to rebound. A new cycle thus commences with the piston again being driven upward by the system pressure acting on drive surface 742.

It is not necessary that the drive chambers be large, since the compressibility arises from accumulator 750. The dimensions of chamber 720 are set based on space requirements for the channels.

It is to be understood that the invention is not limited to the specific details described herein which are given by way of example only and that various modifications and alterations are possible without departing from the scope of the invention as defined in the appended claims.

The invention claimed is:

1. A valveless hydraulic impact mechanism for connection to a tool for processing rock or concrete or both, the valveless hydraulic impact mechanism comprising:

a machine housing comprising a main cylinder bore and channels for containing a driving medium during operation of the mechanism;

a strike piston mounted within the main cylinder bore such that it can be displaced in the main cylinder bore to repeatedly execute a reciprocating motion relative to the machine housing during operation to impact a tool connectable to the mechanism, the strike piston comprising a drive part, a first drive surface and a second drive surface, wherein the second drive surface is larger than the first drive surface, wherein the drive part of the strike piston separates a first drive chamber from a second drive chamber formed between the strike piston and the machine housing such that the first drive surface is adjacent the first chamber and the second drive surface is adjacent the second drive chamber and wherein the drive chambers are arranged such that they contain the driving medium under pressure during operation, wherein the channels comprise a supply channel for supplying pressure to the first drive chamber, a connection channel for connecting the first drive chamber to the second drive chamber, and a drainage channel for connecting the second drive chamber to exhaust pressure, wherein the mechanism further comprises an accumulator, wherein the accumulator contains an accumulator piston mounted therein and the accumulator further comprises an accumulator compartment containing a gas under pressure or a spring or metal bellows, wherein the strike piston and accumulator piston are solely in fluid communication such that the strike piston and accumulator piston do not make direct contact during operation of the mechanism, wherein the second drive chamber is formed between the strike piston and the accumulator piston, wherein the accumulator piston is configured to separate the driving medium in the second drive chamber from the accumulator compartment during operation of the mechanism, wherein a volume of the accumulator compartment varies with a frequency of the impact mechanism during operation as a consequence of the reciprocating motion of the accumulator piston, wherein a position for the opening of the drainage channel is arranged along the main cylinder bore so as to be opened and closed by a portion of the strike piston, the position for the opening of a connection channel leading to the first drive chamber is arranged along the main cylinder bore so as to be opened and closed by a portion of the strike piston and the position for the opening of the connection channel leading to the second drive chamber is arranged in the main cylinder bore so as to be opened and closed by a portion of the accumulator piston such that, with the aid of the strike piston during its motion in the main cylinder bore and the accumulator piston in the main or further cylinder bore, at least the second drive chamber acquires periodically alternating pressure for the maintenance of the reciprocating piston motion, wherein during operation of the mechanism, the strike and accumulator pistons hold the second drive chamber closed for the supply or drainage of driving medium present in the second drive chamber along a distance between the opening of the drainage channel in association with a first turning point of the strike piston and the opening of the connection channel in association with a second turning point of the strike piston, wherein the motion of the strike piston along the distance between the opening of the drainage channel in association with the first turning point of the strike piston and the opening of the connection channel in association with the second turning point of the strike piston takes place during compression or expansion of the volume of the accumulator compartment, wherein the magnitude of the volume of the accumulator compartment is adapted to obtain a slow change in pressure in the second drive chamber along the distance between the channel openings;

wherein the position for the opening of the connection channel leading to the first drive chamber is arranged along the main cylinder bore so as to be opened by the strike piston continuing its movement towards the second turning point after the piston closes the drainage channel.

2. The valveless hydraulic impact mechanism according to claim 1, wherein the accumulator further comprises a dampening chamber to accelerate the braking of the accumulator piston before the turning points of the accumulator piston.

3. The valveless hydraulic impact mechanism according to claim 2, wherein the accumulator piston and the dampening chambers are configured such that, when the accumulator piston enters the dampening chamber, a gap of width less than 0.5 mm arises between them, this gap constituting a gap seal between the dampening chamber and the second drive chamber or the accumulator compartment.

4. The valveless hydraulic impact mechanism according to claim 1, wherein the accumulator comprises at least one seal on the hydraulic side and at least one seal on the gas or bellows side.

5. The valveless hydraulic impact mechanism according to claim 1, wherein the accumulator comprises at least one seal on the hydraulic side and at least one seal on the gas or bellows side and wherein the cylinder bore accommodating the accumulator comprises at least two groves for mounting of the sealing elements.

6. The valveless hydraulic impact mechanism according to claim 5, wherein the accumulator comprises a channel that opens out into the cylinder bore between the two sealing elements for drainage of driving medium.

7. A rock drill comprising the hydraulic impact mechanism of claim 1.

8. A hydraulic breaker comprising the hydraulic impact mechanism of claim 1.

9. An in-hole rock drilling machine comprising the hydraulic impact mechanism of claim 1.

10. The valveless hydraulic impact mechanism according to claim 1, wherein the length of the drive part of the strike piston is equal to or longer than the distance between the position for the opening of the connection channel leading to the first drive chamber and the position for the opening of the drainage channel in the main cylinder bore.

11. The valveless hydraulic impact mechanism according to claim 1, wherein the machine housing further comprises a further cylinder bore in fluid communication with the main cylinder bore, wherein the accumulator piston can be displaced in the further cylinder bore, wherein the position for the opening of the connection channel leading to the second drive chamber is arranged in the further cylinder bore so as to be opened and closed by a portion of the accumulator piston such that, with the aid of the strike piston during its motion in the first cylinder bore and the accumulator piston in the further cylinder bore, at least the second drive chamber acquires periodically alternating pressure for the maintenance of the reciprocating piston motion.

12. A valveless hydraulic impact mechanism for connection to a tool for processing rock or concrete or both, the valveless hydraulic impact mechanism comprising:

a machine housing comprising a main cylinder bore and channels for containing a driving medium during operation of the mechanism;

a strike piston mounted within the main cylinder bore such that it can be displaced in the main cylinder bore to repeatedly execute a reciprocating motion relative to the machine housing during operation to impact a tool connectable to the mechanism, the strike piston comprising a drive part, a first drive surface and a second drive surface, wherein the second drive surface is larger than the first drive surface, wherein the drive part of the strike piston separates a first drive chamber from a second drive chamber formed between the strike piston and the machine housing such that the first drive surface is adjacent the first chamber and the second drive surface is adjacent the second drive chamber and wherein the drive chambers are arranged such that they contain the driving medium under pressure during operation, wherein the channels comprise a supply channel for supplying pressure to the first drive chamber, a connection channel for connecting the first drive chamber to the second drive chamber, and a drainage channel for connecting the second drive chamber to exhaust pressure, wherein the mechanism further comprises an accumulator, wherein the accumulator contains an accumulator piston mounted therein and the accumulator further comprises an accumulator compartment containing a gas under pressure or a spring or metal bellows, wherein the strike piston and accumulator piston are solely in fluid communication such that the strike piston and accumulator piston do not make direct contact during operation of the mechanism, wherein the second drive chamber is formed between the strike piston and the accumulator piston, wherein the accumulator piston is configured to separate the driving medium in the second drive chamber from the accumulator compartment during operation of the mechanism, wherein a volume of the accumulator compartment varies with a frequency of the impact mechanism during operation as a consequence of the reciprocating motion of the accumulator piston, wherein a position for the opening of the drainage channel is arranged along the main cylinder bore so as to be opened and closed by a portion of the strike piston, the position for the opening of a connection channel leading to the first drive chamber is arranged along the main cylinder bore so as to be opened and closed by a portion of the strike piston and the position for the opening of the connection channel leading to the second drive chamber is arranged in the main cylinder bore so as to be opened and closed by a portion of the accumulator piston such that, with the aid of the strike piston during its motion in the main cylinder bore and the accumulator piston in the main cylinder bore, at least the second drive chamber acquires periodically alternating pressure for the maintenance of the reciprocating piston motion, wherein during operation of the mechanism, the strike and accumulator pistons hold the second drive chamber closed for the supply or drainage of driving medium present in the second drive chamber along a distance between the opening of the drainage channel in association with a first turning point of the strike piston and the opening of the connection channel in association with a second turning point of the strike piston, wherein the motion of the strike piston along the distance between the opening of the drainage channel in association with the first turning point of the strike piston and the opening of the connection channel in association with the second turning point of the strike piston takes place during compression or expansion of the volume of the accumulator compartment, wherein the magnitude of the volume of the accumulator compartment is adapted to obtain a slow change in pressure in the second drive chamber along the distance between the channel openings, wherein the accumulator piston has a first drive surface adjacent the accumulator compartment and a second drive surface adjacent the second drive chamber and wherein the strike piston moves along a distance d1 between the closure by the strike piston of the drainage channel leading from the second drive chamber and the opening by the accumulator piston of the connection channel in the second drive chamber, and the accumulator piston travels a distance d2 between the closure by the strike piston of the drainage channel in the second drive chamber and the opening by the accumulator piston of the connection channel leading to the second drive chamber, wherein d2 is proportional to the product of d1 and the ratio of piston second drive surface and the accumulator piston second drive surface.

13. The valveless hydraulic impact mechanism according to claim 12, wherein the machine housing further comprises a further cylinder bore in fluid communication with the main cylinder bore, wherein the accumulator piston can be displaced in the further cylinder bore, wherein the position for the opening of the connection channel leading to the second drive chamber is arranged in the further cylinder bore so as to be opened and closed by a portion of the accumulator piston such that, with the aid of the strike piston during its motion in the first cylinder bore and the accumulator piston in the further cylinder bore, at least the second drive chamber acquires periodically alternating pressure for the maintenance of the reciprocating piston motion.

14. A rock drill comprising the hydraulic impact mechanism of claim 12.

15. A hydraulic breaker comprising the hydraulic impact mechanism of claim 12.

16. An in-hole rock drilling machine comprising the hydraulic impact mechanism of claim 12.

17. A valveless hydraulic impact mechanism for connection to a tool for processing rock or concrete or both, the valveless hydraulic impact mechanism comprising:

a machine housing comprising a main cylinder bore and channels for containing a driving medium during operation of the mechanism;

a strike piston mounted within the main cylinder bore such that it can be displaced in the main cylinder bore to repeatedly execute a reciprocating motion relative to the machine housing during operation to impact a tool connectable to the mechanism, the strike piston comprising a drive part, a first drive surface and a second drive surface, wherein the second drive surface is larger than the first drive surface, wherein the drive part of the strike piston separates a first drive chamber from a second drive chamber formed between the strike piston and the machine housing such that the first drive surface is adjacent the first chamber and the second drive surface is adjacent the second drive chamber and wherein the drive chambers are arranged such that they contain the driving medium under pressure during operation, wherein the channels comprise a supply channel for supplying pressure to the first drive chamber, a connection channel for connecting the first drive chamber to the second drive chamber, and a drainage channel for connecting the second drive chamber to exhaust pressure, wherein the mechanism further comprises an accumulator, wherein the accumulator contains an accumulator piston mounted therein and the accumulator further comprises an accumulator compartment containing a gas under pressure or a spring or metal bellows, wherein the strike piston and accumulator piston are solely in fluid communication such that the strike piston and accumulator piston do not make direct contact during operation of the mechanism, wherein the second drive chamber is formed between the strike piston and the accumulator piston, wherein the accumulator piston is configured to separate the driving medium in the second drive chamber from the accumulator compartment during operation of the mechanism, wherein a volume of the accumulator compartment varies with a frequency of the impact mechanism during operation as a consequence of the reciprocating motion of the accumulator piston, wherein the position for the opening of a drainage channel is arranged along the main cylinder bore so as to be opened and closed by a portion of a strike piston, the position for the opening of a connection channel leading to the first drive chamber is arranged along the main cylinder bore so as to be opened and closed by a portion of the strike piston and the position for the opening of the connection channel leading to the second drive chamber is arranged in the main cylinder bore so as to be opened and closed by a portion of the accumulator piston such that, with the aid of the strike piston during its motion in the main cylinder bore and the accumulator piston in the main cylinder bore, at least the second drive chamber acquires periodically alternating pressure for the maintenance of the reciprocating piston motion, wherein during operation of the mechanism, the strike and accumulator pistons hold the second drive chamber closed for the supply or drainage of driving medium present in the second drive chamber along a distance between the opening of the drainage channel in association with a first turning point of the strike piston and the opening of the connection channel in association with a second turning point of the strike piston, wherein the motion of the strike piston along the distance between the opening of the drainage channel in association with the first turning point of the strike piston and the opening of the connection channel in association with the second turning point of the strike piston takes place during compression or expansion of the volume of the accumulator compartment, wherein the magnitude of the volume of the accumulator compartment is adapted to obtain a slow change in pressure in the second drive chamber along the distance between the channel openings, wherein the strike piston is provided with an internal channel which communicates with the drainage channel, enabling the use of the process fluid for the flushing of process cuttings out of a borehole.

18. The valveless hydraulic impact mechanism according to claim 17, wherein the machine housing further comprises a further cylinder bore in fluid communication with the main cylinder bore, wherein the accumulator piston can be displaced in the further cylinder bore, wherein the position for the opening of the connection channel leading to the second drive chamber is arranged in the further cylinder bore so as to be opened and closed by a portion of the accumulator piston such that, with the aid of the strike piston during its motion in the first cylinder bore and the accumulator piston in the further cylinder bore, at least the second drive chamber acquires periodically alternating pressure for the maintenance of the reciprocating piston motion.

19. A rock drill comprising the hydraulic impact mechanism of claim 17.

20. A hydraulic breaker comprising the hydraulic impact mechanism of claim 17.

* * * * *